United States Patent
Noiret et al.

(10) Patent No.: US 8,686,341 B2
(45) Date of Patent: Apr. 1, 2014

(54) IMAGE SENSOR WITH DOUBLE INTEGRATION TIME AND CONDITIONAL SELECTION

(75) Inventors: Andy Noiret, Colmar (FR); Thierry Ligozat, Quaiz en Chartreuse (FR)

(73) Assignee: E2V Semiconductors, Saint-Égrève (FR)

( * ) Notice: Subject to any disclaimer, the term of this patent is extended or adjusted under 35 U.S.C. 154(b) by 174 days.

(21) Appl. No.: 13/427,703

(22) Filed: Mar. 22, 2012

(65) Prior Publication Data

US 2012/0241594 A1    Sep. 27, 2012

(30) Foreign Application Priority Data

Mar. 23, 2011   (FR) ...................................... 11 52415

(51) Int. Cl.
*H01L 27/00*     (2006.01)

(52) U.S. Cl.
USPC ...................... 250/208.1; 250/214 R; 348/308

(58) Field of Classification Search
USPC ................ 250/208.1, 214 R, 214 A, 214 AG, 250/214 DC, 214 C; 348/300, 308, 312, 348/E5.091

See application file for complete search history.

(56) References Cited

U.S. PATENT DOCUMENTS

| 7,119,317 B2 * | 10/2006 | Ando et al. ................. 250/208.1 |
| 8,159,587 B2 * | 4/2012 | Deschamps et al. .......... 348/308 |
| 2009/0153715 A1 | 6/2009 | Deschamps et al. |
| 2011/0234876 A1 | 9/2011 | Leconte |

FOREIGN PATENT DOCUMENTS

| EP | 2071825 A1 | 6/2009 |
| WO | 2010066850 A1 | 6/2010 |

OTHER PUBLICATIONS

French Search Report for FR1152415, dated Sep. 27, 2011.

* cited by examiner

*Primary Examiner* — Kevin Pyo
(74) *Attorney, Agent, or Firm* — Lowe Hauptman & Ham, LLP

(57) ABSTRACT

An image sensor for gathering images at one and the same time at low illumination level and at high illumination level is described. The sensor operates with a double integration time at each frame. Two successive charge transfers from a photodiode to a storage node are performed, the first after a first duration, the second after a second duration different from the first. The potential of the storage node after the first transfer of charge is sampled in a first capacitor of the reading circuit. The potential after a reinitialization of the storage node is sampled in a second capacitor. A level of potential taken after the second transfer is conditionally resampled in the first capacitor. The condition of the resampling is a condition of signal level after the first transfer. This level is applied to the differential amplifier of a ramp-type converter for a short duration of ramp.

18 Claims, 4 Drawing Sheets

US 8,686,341 B2

IMAGE SENSOR WITH DOUBLE INTEGRATION TIME AND CONDITIONAL SELECTION

RELATED APPLICATIONS

The present application is based on, and claims priority from, French Application No. 1152415, filed Mar. 23, 2011, the disclosure of which is hereby incorporated by reference herein in its entirety

FIELD OF THE INVENTION

The invention relates to image sensors, and more particularly to those which are intended to gather images at one and the same time at low luminance level and at high luminance level.

BACKGROUND OF THE INVENTION

In general, active pixels comprise a photodiode and three, four or five MOS transistors making it possible to control the reading of the charge generated by light in the photodiode. Pixels with four transistors operate by firstly transferring from the photodiode to a capacitive storage node the charge generated by light, and then by carrying the potential of the storage node over to a column conductor; one of the transistors serves to reinitialize the potential of the storage node before the transfer of charge from the photodiode to the storage node. Pixels with five transistors furthermore comprise a transistor for reinitializing the potential of the photodiode.

A mode of operation of the sensor with a double duration of integration at each image frame is described in patent publication WO2010/066850. After a first duration Ti1, the charge engendered by the photodiode is transferred into the storage node. Next, slightly before the end of a second duration Ti2, longer than the duration Ti1, the potential of the storage node is sampled in a capacitor of a reading circuit, the potential of the storage node is reinitialized, the reinitialization potential is sampled in another capacitor, and the charge resulting from the second duration of integration is transferred from the photodiode to the storage node. Thereupon, the level of the potential of the storage node is tested. If it indicates a risk of saturation of the pixel, then one will use the samples already stored in order to carry out on the basis of their difference an analog-digital conversion representing the illumination level received by the pixel. If conversely the level of the potential of the storage node shows that there is no risk of saturation, a third sampling is done which replaces in the first capacitor the previously stored level, and this new sample is employed in order to do the analog-digital conversion of the difference between the third sample and the second.

A third conditional sampling is therefore done as a function of the level of the charge gathered during the second duration of integration. The choice is made pixel by pixel at the moment of the reading of a row of pixels.

Provision may also be made for the second duration of integration to be shorter than the first. In this case a test is performed on the level of potential of the storage node before the second transfer to the storage node; this is the potential resulting from the longer integration. This time, if there is a risk of saturation, the third sampling will be done before doing the analog-digital conversion; if there is no risk of saturation it will not be done and the analog-digital conversion will be done on the basis of the first and of the second sample.

In the case where it is the level resulting from the shorter duration of integration which is converted into digital, the result of the conversion is multiplied by the ratio of the longer duration to the shorter duration so as to refer the value to the same scale as the result of the conversion of the charge level arising from the longer integration.

It has been noted that this test for deciding on the third sampling exhibited drawbacks.

Firstly a comparator (bulky) is necessary for each column. Then, the test is done on an absolute value of the potential of a column conductor receiving the level of potential of the storage node at the moment of selecting a row of pixels. This potential is compared with a threshold which defines the risk of saturation. The test therefore pertains to an absolute value of level of potential, not to a differential value (useful level of potential minus reinitialization level). This creates an uncertainty in the choice of the threshold to be used. Moreover, there are other uncertainties in the value of the threshold that must be applied to the comparator in order to detect a risk of saturation. These uncertainties are related to variations in the manufacturing method, to temperature variations, to the differences in offset voltage of the reading transistors in the various pixels, to the differences of offset voltages of the comparators corresponding to the various columns of the matrix of pixels. It is therefore mandatory to take significant margins in order to determine the threshold making it possible to know whether or not there is a risk of saturation. This entails a loss of dynamic range, that is to say a reduction in the interval of illuminations that the sensor can actually measure for a given duration of integration. Finally, the necessity to do this voltage comparison at a moment other than the moment of the sampling of a level of potential of the column conductor entails additional current consumption. Indeed, the column conductor is energized only during the phases where it has to copy the level of potential of the storage node. Here, it must be energized both during the test and during the third sampling which is posterior to this comparison.

SUMMARY OF THE INVENTION

To avoid these drawbacks, the invention proposes to use parts of the analog-digital converter to test the differential voltage between the first and the second sample after these samples have been stored and before the instant scheduled for the third sampling. The analog-digital converter is a ramp-type converter using a linear voltage ramp and a differential amplifier with large gain which toggles when the difference of voltage on its two inputs becomes zero on account of the voltage ramp. According to the invention, a short linear voltage ramp of fixed duration and known slope will be applied; if the amplifier has toggled before the end of the ramp, it will be considered that the illumination has remained below a threshold and a conclusion will be drawn therefrom regarding a new sampling to be done in the first capacitor. The third sampling, when it is performed, replaces the first sample. The definitive analog-digital conversion is done on the samples stored after the instant reserved for the third sampling, whether or not there has been a third sampling.

Consequently the invention proposes an image sensor with active pixels comprising a matrix of pixels organized in rows and columns. The pixels of one and the same column are linked to a column conductor itself linked to a reading circuit. Each pixel compromises a photodiode linked by a transfer transistor to a storage node, and a row selection transistor for linking the storage node to the column conductor or isolating it from this conductor. The sensor compromises means for performing, during one and the same cycle of integration and reading of the charge of a pixel, two transfers of charge from the photodiode to the storage node, the first after a first duration of integration, the second after a second duration of integration following the first duration. Means are provided for doing a first sampling, in a first sampling capacitor of the reading circuit, of the level of potential taken by the column conductor after the first transfer of charge. Means are provided for doing a second sampling, in a second capacitor of the reading circuit, of the level of potential taken by the column conductor after a reinitialization of the storage node, and means for doing a third conditional sampling in the first capacitor of a level of potential taken after the second transfer of charge. The reading circuit compromises a ramp-type analog-digital converter comprising a differential amplifier linked to the two capacitors and means for applying a linear voltage ramp to one of the capacitors, the effect of the ramp being to cause the amplifier to toggle after a variable duration dependent on the potentials sampled in the capacitors. The sensor comprises means for applying firstly a provisional ramp, after the first transfer of charge, the state of the output of the amplifier at the end of the provisional ramp being stored so as to enable or disable the third conditional sampling, and thereafter a definitive ramp after the second transfer of charge so as to perform an analog-digital conversion of the difference between the voltages sampled in the two capacitors.

The slope of the provisional ramp may be steeper than the slope of the definitive ramp so as to accelerate the comparison phase. The duration of the ramp is fixed.

The state of the output of the amplifier at the end of the provisional ramp serves not only to trigger or not trigger the third sampling, but also to preserve an item of information about the decision to multiply thereafter or not multiply the value of the definitive conversion by the ratio of the longer duration of integration to the shorter duration.

In the case where the pixel is constructed with means for performing a multiplication of electrons within the pixel with a multiplier coefficient which is not the same for the two durations of integration, the value of the definitive conversion is likewise multiplied by the ratio of the multiplication factor used during the longer duration to the multiplication factor used during the shorter duration.

In one embodiment, the first duration of integration is the shorter. The toggling of the amplifier before the end of the ramp indicates an illumination below a threshold determined by the level at the end of the ramp, and enables the application of a third sampling; the absence of toggling indicates an illumination above the threshold and disables the third sampling.

Preferably, the duration of the provisional ramp is chosen so that the variation of potential between the start and the end of the provisional ramp is a fraction of the variation between the start and the end of the definitive ramp, this fraction being lower than or equal to (preferably: slightly lower than) the ratio of the two durations of integration.

In another embodiment, the first duration is the longer. The toggling of the amplifier disables the application of a third sampling. In this case, provision is preferably made for the reinitialization of the storage node after the first transfer of charge to be done in two steps with two different levels of reinitialization potential, with on each occasion a sampling of the reinitialization potential in the second capacitor; the provisional test ramp is applied between the two samplings of the reinitialization level.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DESCRIPTION OF PREFERRED EMBODIMENTS

Figure 1:
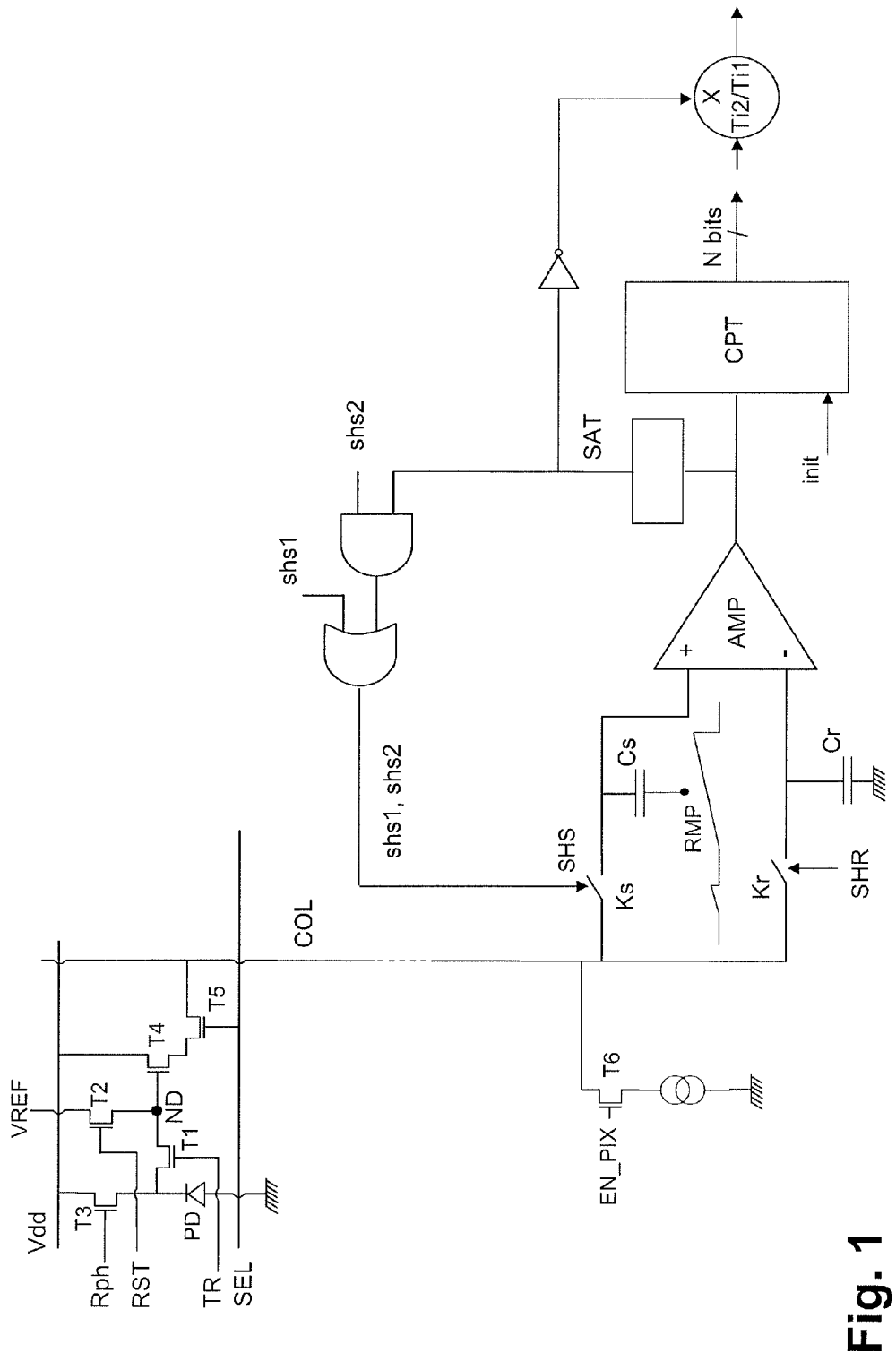
FIG. 1 represents the structure of a pixel and of the reading circuit of a sensor according to the invention.

An active pixel with five transistors and a reading circuit of a sensor according to the invention are represented in FIG. 1. The structure of the pixel is conventional. It comprises a photodiode PD, a capacitive storage node ND (represented by a simple point in FIG. 1, and embodied in practice by an N-type diffusion in a P-type layer), a transistor for charge transfer T1 between the cathode of the photodiode and the storage node, a transistor T2 for reinitializing the potential of the storage node, a transistor T3 for reinitializing the potential of the photodiode, a follower transistor T4, a row selection transistor T5. For a pixel with four transistors the transistor T3 would be dispensed with.

The transfer transistor T1 is controlled by a transfer signal TR. The transistor T2 has its drain linked to a reference potential VREF and it is controlled by a reinitialization control signal RST. The transistor T3 is linked between the cathode of the photodiode and a reference potential which may be a power supply potential Vdd. It is controlled by a reinitialization signal Rph. The follower transistor T4 has its drain linked to a fixed potential which may be the power supply Vdd, its source linked to the row selection transistor T5, and its gate linked to the storage node ND. Finally, the row selection transistor T5 has its gate linked to a row selection conductor which links all the row selection transistors of one and the same row of pixels; this conductor is controlled by a row selection signal SEL specific to this row; the drain of T5 is linked to the source of the follower transistor and its source is linked to a column conductor COL common to all the pixels of one and the same column of pixels.

The column conductor is linked to a reading circuit, at the foot of the column. It is also linked to a current source through a transistor T6. When the transistor T6 is turned on by a signal EN_PIX, the transistor T4 of the pixel selected behaves as a voltage follower and the storage node carries its potential over to the column conductor. The signal EN_PIX serves to isolate the current source from the column conductor so as to limit consumption outside of the phases of sampling of the potential of the column conductor.

The reading circuit comprises sampling means for sampling and preserving the value of the potential of the column conductor at diverse instants of the sequence for reading the illumination information arising from the selected pixel.

These sampling means comprise a capacitor Cr and a capacitor Cs and respective switches Kr and Ks for enabling the application of the column potential to these capacitors. The switches Kr and Ks are controlled respectively by signals denoted globally by SHR and SHS.

The reading circuit also comprises an analog-digital converter for converting into digital the differential voltage between the potential sampled on the capacitor Cr, which is a level of potential for reinitializing the storage node ND, and the potential sampled on the capacitor Cs, which is a level of useful potential after a transfer of charge from the photodiode to the storage node.

The converter is a ramp-type converter. Ramp-type converters essentially comprise a linear voltage ramp generator, a differential amplifier with autozero with large gain AMP which toggles when the voltages on its two inputs become equal in the course of the evolution of the ramp, and a counter CPT synchronized with the ramp generator and which counts at high frequency from the start of the ramp until the amplifier toggles. The linear ramp generator is represented by a simple point linked to the capacitor Cs.

Such a converter operates as follows: to convert the differential voltage between the capacitors, the capacitors are linked to the inputs of the differential amplifier, and at an initial instant (marking the start of the conversion) a linear voltage ramp is applied to the other terminal of the capacitors and a startup pulse to the counter. The output of the differential amplifier toggles and defines the end of the counting when the voltages become equal on the two terminals of the capacitors linked to the amplifier. The content of the counter then represents the time that was required in order to attain this equality; the voltage ramp being linear, this time is proportional to the difference of the potentials which were present on the inputs at the initial instant of startup of the ramp. The content of the counter after the end of the ramp is placed in memory and represents an illumination value obtained by double sampling in the capacitors.

The ramp may be common to all the reading circuits, that is to say to all the columns of the matrix.

The counter may be provided individually in each reading circuit; or else it is possible to provide a single counter for all the columns, and in this case the reading circuit associated with a column comprises a memory able to store the content of the counter at the moment of the toggling of the differential amplifier of this column.

In what follows it is considered by way of example that there is a counter in each reading circuit.

The details of the sequence for measuring the illumination received by a pixel in the course of an image frame will now be described with reference to the timechart of FIG. 2 and the other elements of FIG. 1 will be explained at the same time.

The capture of an image is done frame by frame using two consecutive durations of integration of different values Ti1 and Ti2 in the course of the same frame. The signal gathered for the shorter duration is used for the pixels receiving a great deal of light, the signal gathered for the longer duration is used for the pixels receiving the longer duration. The choice is made pixel by pixel and frame by frame. In the case of FIG. 2, the first duration Ti1 is the shorter.

The measurement sequence is as follows. It is assumed, although this is not mandatory, that a transistor T3 for reinitializing the photodiode is provided in the pixel. If such a transistor were not provided, the photodiode would be reinitialized by simultaneously turning on the transistors T1 and T2.

A reinitialization temporal notch pulse Rph is applied to the gate of the transistor T3 for a whole row of pixels. This notch pulse acts so as to empty the charge stored in the photodiode PD to the power supply potential Vdd. The integration of charge in the photodiode is prevented for as long as this notch pulse lasts. The notch pulse Rph is provided independently for each row and is offset from one row to the other. Only the timechart corresponding to a row is represented.

A first integration of charge in the photodiode PD occurs for a duration Ti1.

At an intermediate instant in the course of this duration, a brief notch pulse $RST_a$ which turns on these transistors is produced on the gate of the transistors T2 of all the pixels of the row. The potential of the storage node ND is reinitialized, for all the transistors of the row, to a fixed value related to the potential VREF.

Next a first charge transfer notch pulse $TR_a$ is applied to the control gate of the transfer transistors T1 of the row. The charge generated by the light in the photodiode spills over into the storage node. Said charge modifies the potential of this node. The end of the first duration of charge integration Ti1 is defined by the end of the first transfer notch pulse $TR_a$.

A second duration of integration Ti2 then begins. The photodiode has been emptied of its charge during the notch pulse $TR_a$ and now integrates other charge.

Before the end of the duration Ti2, a notch pulse SEL for selecting the row of pixels is established so as to engage the process for reading the pixels of this row. This notch pulse turns on the row selection transistor T5. This activates the follower transistor T4 and carries the potential of the storage node ND over to the column conductor COL (to within a transistor gate-source voltage). The column conductor then takes a first level of potential. The notch pulse SEL remains active throughout the duration of reading of the pixels of the row considered, and then it is interrupted and it is only after this interruption that a similar notch pulse may be applied to another row. However, it may be envisaged that the signal SEL is not continuous during the various operations which follow but activated sporadically only at the moment of the samplings SHR and SHS. For simplicity, a continuous notch pulse has been represented encompassing the duration of all the signals SHR and SHS. The following operations are performed during the notch pulse SEL:

a control notch pulse shs1 is applied to the switch Ks in the reading circuit, so as to gather in a first capacitor Cs of the reading circuit a first sample of the potential present on the column conductor; this potential results from the first transfer of charge and therefore depends on the illumination of the pixel over the first duration of integration Ti1;

a second reinitialization notch pulse $RST_b$ is applied to the gates of the transistors T2 of the row of pixels; the potential of the storage node is reinitialized to a fixed value; a control notch pulse shr is then applied to the switch Kr in the reading circuit, so as to take a second sample representing the reinitialized column potential; this sample is stored in the second sampling capacitor Cr of the reading circuit;

after the end of the notch pulse shr, an operation that may be termed provisional conversion by the ramp-type analog-digital converter is started; this entails only a partial conversion operation since at this juncture there is no need to gather a digital value but only an information bit for verifying the overstepping or non-overstepping of a threshold of illumination received over the first duration of integration; a first linear voltage ramp or provisional ramp RMP1 is applied to a terminal of one of the capacitors, for example the capacitor Cs; it has a fixed duration from an instant $t_{conv1}$ to an instant $t'_{conv1}$ and the slope of the ramp is fixed (it may be steeper than the slope of the ramp which will serve during the definitive analog-digital conversion, a steeper slope making it possible to more quickly attain the threshold defined by the level of potential on the input of the amplifier at the end of the ramp); after this fixed duration, the input amplifier AMP of the converter has toggled or has not toggled; if it has toggled, then the illumination level is low, below a threshold; if it has not toggled, then the level is above the threshold; the information regarding toggling or non-toggling is preserved in memory, for example in a flip-flop which provides a signal SAT;

this information regarding toggling of the amplifier serves as input to a logic circuit (here an AND gate and an OR gate) which enables or disables the subsequent application of a control shs2, which is a third sampling command; in the case where the illumination level is high (the comparator has not toggled before the time $t'_{conv1}$), the subsequent sampling shs2 is not enabled; in the case where the amplifier has toggled, the sampling shs2 is enabled;

a second transfer notch pulse $TR_b$ is thereafter applied, for all the pixels of the row, to the gate of the transfer transistor T1; the charge integrated over the duration Ti2 in the photodiode spills over into the storage node ND; the duration Ti2 terminates at the end of the notch pulse $TR_b$; the potential of the column conductor follows (to within a gate-source voltage) the new potential of the storage node subsequent to this second transfer of charge;

the third sampling command shs2, posterior to the time $t'_{conv1}$, places in the capacitor Cs a sample of the potential of the column conductor in substitution for the current content of the capacitor Cs; this potential represents the level of the storage node after the spillover of charge of the photodiode at the end of the second duration of integration Ti2;

finally the definitive analog-digital conversion of the difference between the content of the capacitor Cr and the content of the capacitor Cs is executed; the latter content represents the useful signal resulting from the second or from the first duration of integration depending on whether the signal shs2 has or has not been produced; this definitive conversion step is executed with a definitive linear voltage ramp RMP2 which restarts from zero at an instant $t_{conv2}$ and which has a duration sufficient to allow the conversion of the differential voltage stored in the capacitors.

The slope and the duration of the first conversion ramp RMP1 are chosen so that the toggling of the comparator at the end of this duration corresponds to the limit of illumination which would run the risk of saturating the pixel if the second duration of integration were used. The level of potential attained at the end of the provisional ramp on the input of the differential amplifier is equal to a fraction of the level of potential attained at the end of the definitive ramp. This fraction is preferably slightly less than the ratio of the duration Ti1 to the duration Ti2.

In the case where the amplifier AMP has not toggled before the instant $t'_{conv1}$ the converter converts the level of potential arising from the first duration of integration but the result of the conversion must be multiplied by the ratio Ti2/Ti1 to refer it to the same scale as if the conversion pertained to the result of the second duration of integration. The result SAT of the test performed at the instant $t'_{conv1}$ is therefore retained in memory so as to enable or disable this multiplication.

The multiplication may be done outside of the sensor.

In the case where the pixel is constructed with means for performing a multiplication of electrons within the pixel with a multiplier coefficient which is not the same for the two durations of integration, the value of the definitive conversion is likewise multiplied by the ratio of the multiplication factor used for the longer duration to the multiplication factor used for the shorter duration.

It will be understood that the duration of the test may be extremely short, and consequently it does not significantly slow down the pixel reading process. Indeed, if the ratio of the durations Ti2 and Ti1 is for example 10, the illumination threshold for which the comparator must toggle is low (a tenth of the interval of illuminations that is measurable with the first integration time). The comparator will therefore toggle very quickly after the start of the ramp in order to attain this threshold, especially if the slope of the ramp is steep. The ramp may be steep since not much precision is needed for this detection of illumination threshold (only constancy is needed).

In a variant embodiment, provision may be made for the first duration of integration Ti1 to be the longer of the two durations. The test of condition of third sampling shs2 is also done on the result of the first charge transfer but the threshold to be provided for is not the same and the sense of the condition is reversed: if the illumination oversteps a threshold, the third sampling shs2 is done, otherwise it is not done.

Figure 2:
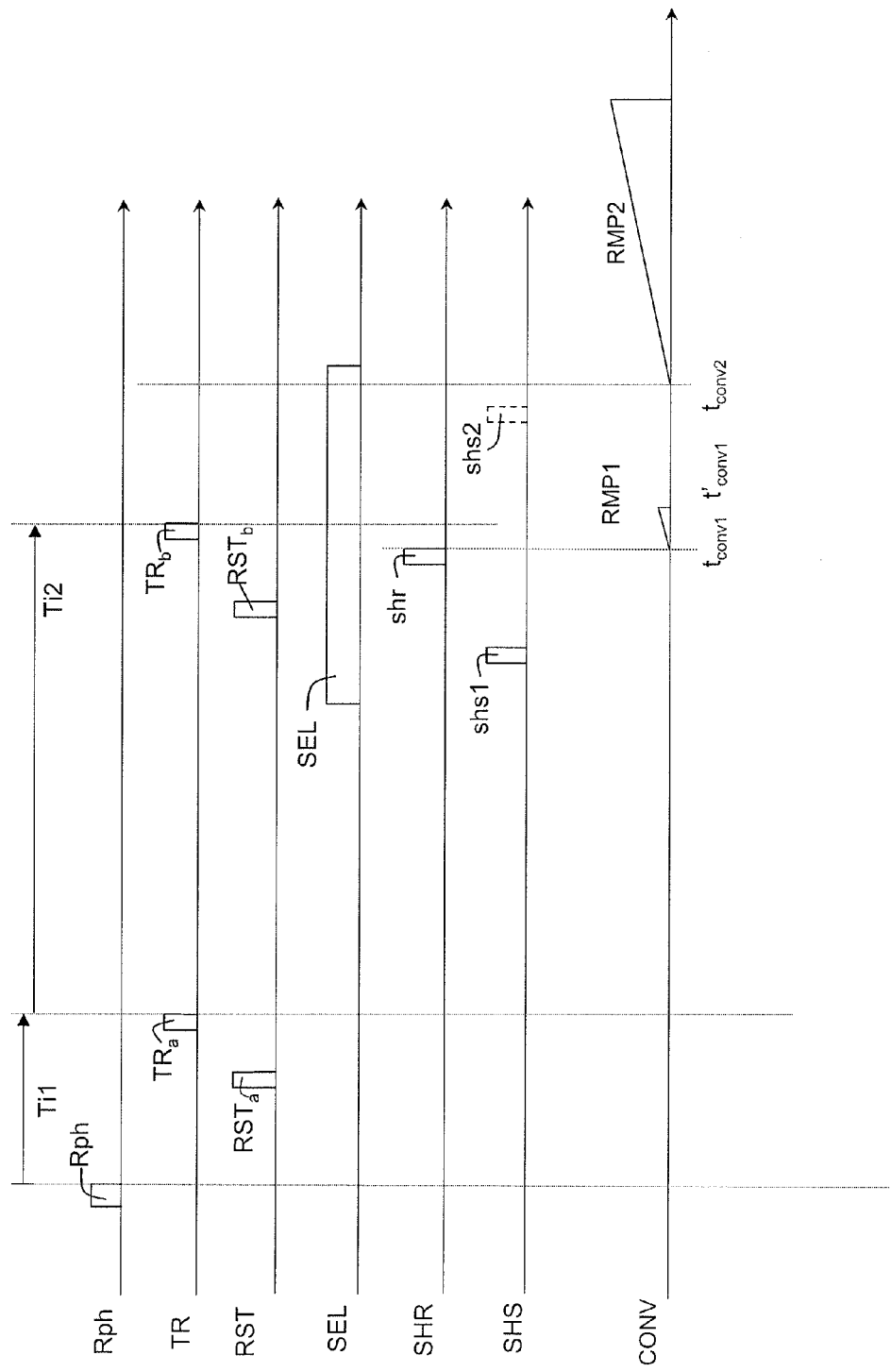
FIG. 2 represents an operating timechart for the pixel and for the reading circuit.
Figure 3:
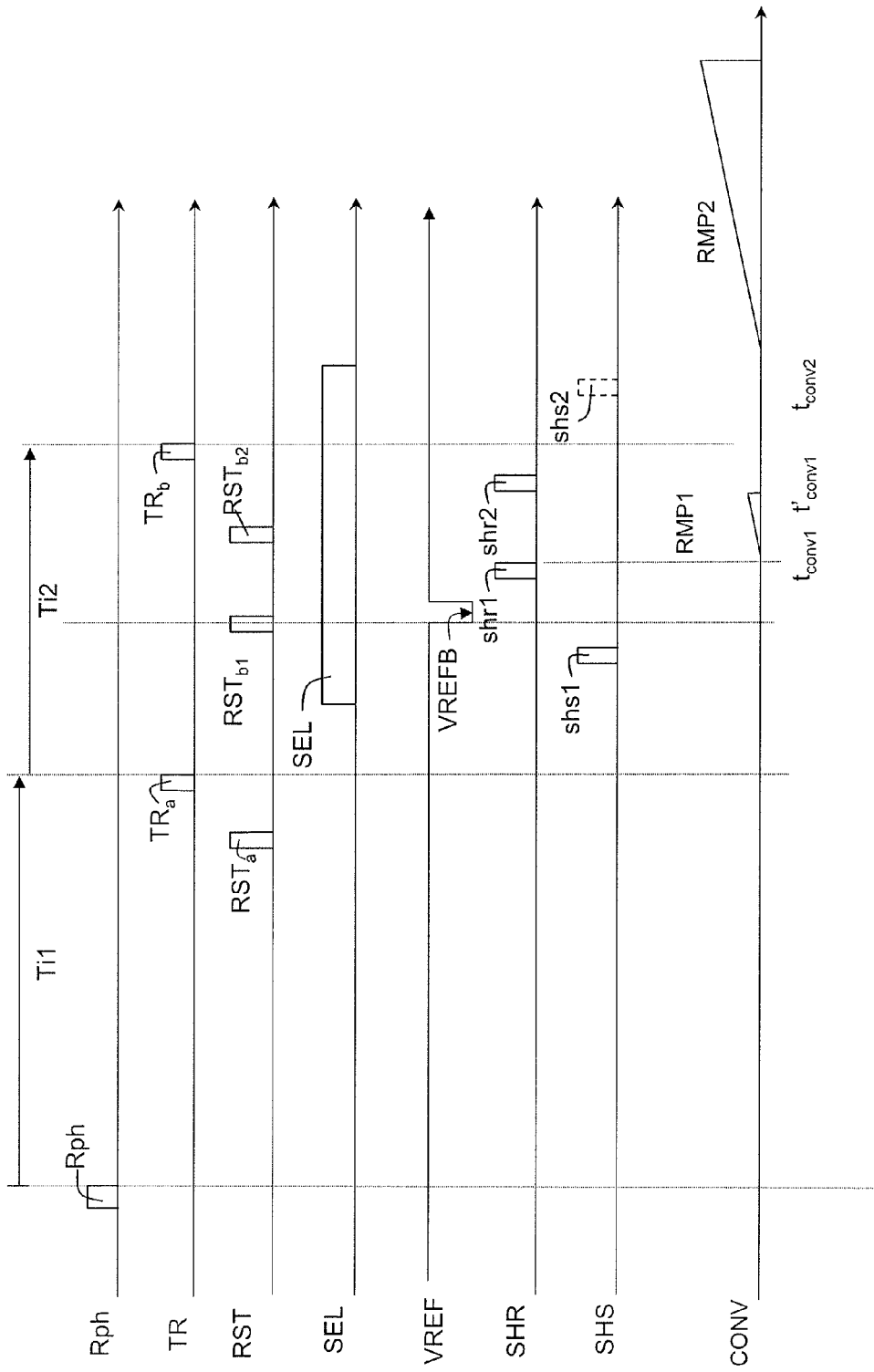
FIG. 3 represents an operating timechart variant.

It is possible to execute the same sequence as in FIG. 2. A drawback is that it would be necessary to considerably increase the slope of the ramp if it is not desired that the duration of the provisional ramp RMP1 be almost the same as the duration of the definitive ramp RMP2. Indeed, the threshold of saturation to be detected is that which results from the illumination for the longer duration Ti1.

Alternatively, to avoid this drawback, the part relating to the reinitialization of the potential of the storage node may be modified in the following manner. Instead of doing a simple reinitialization ($RST_b$) followed by a sampling of the storage potential, two consecutive reinitializations $RST_{b1}$ and $RST_{b2}$ are done with two consecutive samplings in the capacitor Cr by means of two sampling signals shr1 and shr2; the first reinitialization establishes in the storage node a potential which is not at all a high potential VREF defining the zero of the measurement but which is a low potential VREFB which is close to the threshold which will serve to condition the third sampling, that is to say a low potential close to a saturation level for the pixel. The test of condition of third sampling shs2 is performed on the difference between the useful level sampled during shs1 and this low reinitialization level defined by VREFB. A short provisional ramp RMP1 will suffice to determine whether one is below or above a saturation threshold and to impose a third sampling shs2 if above.

The second reinitialization $RST_{b2}$ is done with a normal reinitialization level VREF. The result is sampled after the end of the ramp RMP1 in the capacitor Cr. Next, the useful charge obtained during the integration time Ti2 is transferred into the storage node by the notch pulse $TR_b$ and the sampling shs2 is or is not performed depending on the result of the test.

The definitive ramp is applied at an instant $t_{conv2}$ after the instant reserved for the sampling pulse shs2, whether or not this pulse has been enabled. This conversion pertains to the difference between the samples established by the pulses shr2 and shs1 (case of illumination below a threshold) or the samples established by the pulses shr2 and shs2 (case of illumination above the threshold). Only in the second case is the measurement a measurement with true correlated double sampling.

Figure 4:
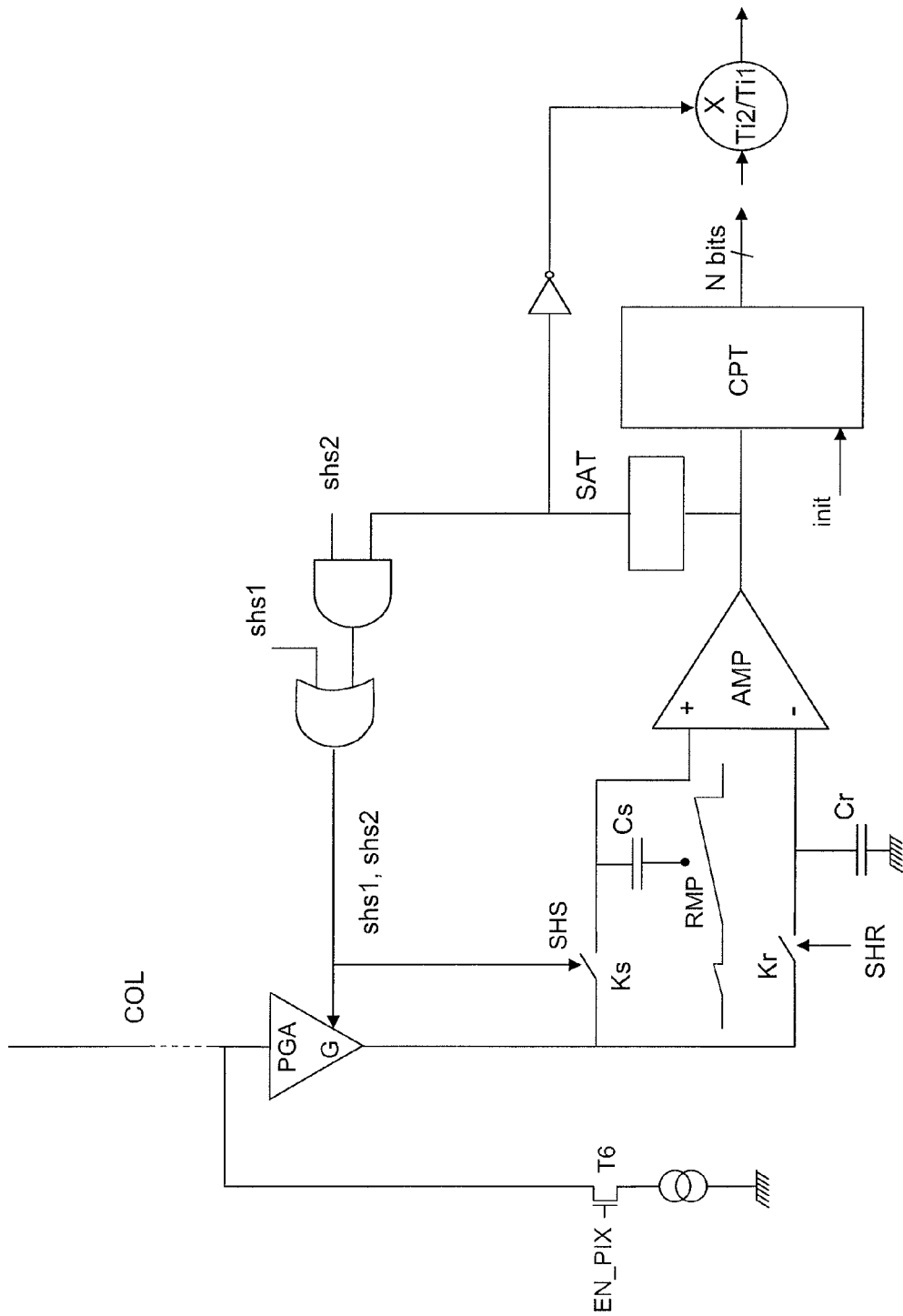
FIG. 4 represents a reading circuit variant with an amplifier with programmable gain.

A possible improvement of the reading circuit at the foot of a column consists in providing for a conditional amplification of the signal on the column conductor. The condition is the same as the condition of use of the third sampling shs2. In this case, as represented in FIG. 4, a low-noise programmable-gain amplifier PGA is inserted between the column conductor and the sampling circuits (capacitors Cr, Cs and switches Kr, Ks). In the case of an illumination below a threshold, detected by the provisional ramp of fixed duration, a decision is taken not only about the third sampling but also a decision is taken about applying a gain G (greater than 1) to the signal, for example a gain of 32. In the case of an illumination above the threshold, the amplifier PGA is controlled such that it has unit gain.

This improvement demands a timechart with a first duration of integration that is shorter than the second (FIG. 2).

The possible offset of this amplifier does not disturb reading since the amplifier is present both in the measurement of the reinitialization level and in the measurement of the useful level after charge spillover. The double sampling remains a true correlated double sampling in the case of weak illuminations.

By applying such a gain it is possible to reduce the long duration of integration so as to accelerate the pace of the image captures. In the case of non-use of the conditional gain, that is to say in the case of strong illumination, it is possible to apply a multiplier coefficient, equal to the conditional gain G, to the measurements made for the strong illuminations, if one wishes to refer these measurements to the same scale as for the weak illuminations.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An image sensor with active pixels comprising a matrix of pixels organized in rows and columns, the pixels of one and the same column being linked to a column conductor itself linked to a reading circuit, each pixel comprising a photodiode linked by a transfer transistor to a storage node, and a row selection transistor for linking the storage node to the column conductor or isolating it from this conductor, the sensor further comprising means for performing during one and the same cycle of integration and reading a first and a second transfer of charge from the photodiode to the storage node, the first transfer occurring after a first duration of integration, the second transfer occurring after a second duration of integration following the first duration, means for doing a first sampling, in a first sampling capacitor of the reading circuit, of the level of potential taken by the column conductor after the first transfer of charge, means for doing a second sampling, in a second capacitor of the reading circuit, of the level of potential taken by the column conductor after a reinitialization of the storage node, and means for doing a third conditional sampling in the first capacitor of a level of potential of the column conductor after the second transfer of charge, the reading circuit comprising a ramp-type analog-digital converter comprising a differential amplifier linked to the two capacitors and means for applying a linear voltage ramp to one of the capacitors, the effect of the ramp being to cause the amplifier to toggle after a variable duration dependent on the potentials sampled in the capacitors, wherein the sensor comprises means for applying firstly a provisional ramp, after the first transfer of charge, the state of the output of the amplifier at the end of the provisional ramp being used to enable or disable the third conditional sampling, and thereafter a definitive ramp after the second transfer of charge for performing a definitive analog-digital conversion of the difference between the voltages sampled in the two capacitors.

2. The sensor as claimed in claim 1, wherein the state of the output of the amplifier at the end of the provisional ramp is preserved in memory so as to provide an item of information on the necessity to multiply the result of the definitive analog-digital conversion by the ratio of the longer duration of integration to the shorter duration.

3. The sensor as claimed in claim 1, wherein the provisional ramp has a steeper slope than the definitive ramp.

4. The sensor as claimed in claim 2, wherein the provisional ramp has a steeper slope than the definitive ramp.

5. The sensor as claimed claim 1, wherein the first duration of integration is shorter than the second and the toggling of the amplifier before the end of the ramp enables the application of a third sampling.

6. The sensor as claimed claim 2, wherein the first duration of integration is shorter than the second and the toggling of the amplifier before the end of the ramp enables the application of a third sampling.

7. The sensor as claimed in claim 5, wherein the duration of the provisional ramp is chosen so that the variation of potential between the start and the end of the definitive ramp is a fraction of the variation between the start and the end of the provisional ramp, this fraction being lower than or equal to the ratio of the two durations of integration.

8. The sensor as claimed in claim 6, wherein the duration of the provisional ramp is chosen so that the variation of potential between the start and the end of the definitive ramp is a fraction of the variation between the start and the end of the provisional ramp, this fraction being lower than or equal to the ratio of the two durations of integration.

9. The sensor as claimed in claim 1, wherein in that the first duration is longer than the second and the toggling of the amplifier disables the application of a third sampling.

10. The sensor as claimed in claim 2, wherein in that the first duration is longer than the second and the toggling of the amplifier disables the application of a third sampling.

11. The sensor as claimed in claim 9, wherein the reinitialization of the storage node after the first transfer of charge is done in two steps with two different levels of reinitialization potential and on each occasion a sampling of the reinitialization potential in the second capacitor, and the provisional test ramp is applied between the two samplings of the reinitialization potential.

12. The sensor as claimed in claim 10, wherein the reinitialization of the storage node after the first transfer of charge is done in two steps with two different levels of reinitialization potential and on each occasion a sampling of the reinitialization potential in the second capacitor, and the provisional test ramp is applied between the two samplings of the reinitialization potential.

13. The sensor as claimed in claim 1, comprising means of conditional amplification of the signal on the column conductor, the condition being the same as the condition of use of the third sampling.

14. The sensor as claimed in claim 2, comprising means of conditional amplification of the signal on the column conductor, the condition being the same as the condition of use of the third sampling.

15. The sensor as claimed in claim 5, comprising means of conditional amplification of the signal on the column conductor, the condition being the same as the condition of use of the third sampling.

16. The sensor as claimed in claim 7, comprising means of conditional amplification of the signal on the column conductor, the condition being the same as the condition of use of the third sampling.

17. The sensor as claimed in claim 9, comprising means of conditional amplification of the signal on the column conductor, the condition being the same as the condition of use of the third sampling.

18. The sensor as claimed in claim 11, comprising means of conditional amplification of the signal on the column conductor, the condition being the same as the condition of use of the third sampling.

* * * * *